(12) United States Patent
Xiao et al.

(10) Patent No.: US 12,387,391 B2
(45) Date of Patent: Aug. 12, 2025

(54) METHOD FOR GENERATING BRUSH EFFECT PICTURE, IMAGE EDITING METHOD, DEVICE, AND STORAGE MEDIUM

(71) Applicant: Huawei Technologies Co., Ltd., Shenzhen (CN)

(72) Inventors: Dong Xiao, Wuhan (CN); Jiaqi Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 18/249,301

(22) PCT Filed: Sep. 8, 2021

(86) PCT No.: PCT/CN2021/117172
§ 371 (c)(1),
(2) Date: Apr. 17, 2023

(87) PCT Pub. No.: WO2022/078116
PCT Pub. Date: Apr. 21, 2022

(65) Prior Publication Data
US 2023/0419562 A1 Dec. 28, 2023

(30) Foreign Application Priority Data
Oct. 16, 2020 (CN) .......................... 202011111524.X

(51) Int. Cl.
*G06T 11/00* (2006.01)
(52) U.S. Cl.
CPC ........ *G06T 11/001* (2013.01); *G06T 2200/24* (2013.01)

(58) Field of Classification Search
CPC ....... G06T 11/001; G06T 11/60; G06T 19/20; G06T 2219/2012; G06T 2207/20092; G06T 2200/24
See application file for complete search history.

(56) References Cited

U.S. PATENT DOCUMENTS

| 2011/0185300 | A1* | 7/2011 | Hinckley | ............. G06T 11/203 715/769 |
| 2014/0059169 | A1 | 2/2014 | Ko et al. | |
| 2017/0103557 | A1* | 4/2017 | Kumar | .................... G06T 11/60 |
| 2019/0378242 | A1 | 12/2019 | Zhang et al. | |
| 2020/0117347 | A1 | 4/2020 | Voliter | |

FOREIGN PATENT DOCUMENTS

CN 103645871 A 3/2014

* cited by examiner

*Primary Examiner* — Antonio A Caschera
(74) *Attorney, Agent, or Firm* — Conley Rose, P.C.

(57) ABSTRACT

A method for generating a brush effect picture includes: determining a pattern extraction area on a display interface in response to an area selection operation on the display interface of a display; obtaining a first brush effect picture based on the pattern extraction area, where a pattern of the first brush effect picture is a pattern corresponding to the pattern extraction area on the display interface; and obtaining a second brush effect picture based on the first brush effect picture, where the pattern of the first brush effect picture is the same as a pattern of the second brush effect picture, and definition of the second brush effect picture is greater than definition of the first brush effect picture.

20 Claims, 10 Drawing Sheets

METHOD FOR GENERATING BRUSH EFFECT PICTURE, IMAGE EDITING METHOD, DEVICE, AND STORAGE MEDIUM

CROSS-REFERENCE TO RELATED APPLICATIONS

This is a U.S. National Stage of International Patent Application No. PCT/CN2021/117172 filed on Sep. 8, 2021, which claims priority to Chinese Patent Application No. 202011111524.X filed on Oct. 16, 2020. Both of the aforementioned applications are hereby incorporated by reference in their entireties.

TECHNICAL FIELD

This application relates to the field of electronic device technologies, and specifically, to a method for generating a brush effect picture, an image editing method, a device, and a storage medium.

BACKGROUND

A brush is an image editing tool. A brush effect picture is configured for the brush, so that a pattern in the brush effect picture can be directly added to an image in a form of the brush, for example, a wood texture or a star pattern.

In a related technology, the brush effect picture is usually provided by the image editing tool, or is customized by a user and then added to the image editing tool. However, both the brush effect picture provided by the image editing tool and the brush effect picture customized by the user have a problem of low definition.

SUMMARY

In view of this, this application provides a method for generating a brush effect picture, applied to a terminal device provided with a display. The method includes:
  determining a pattern extraction area on a display interface in response to an area selection operation on the display interface of the display;
  obtaining a first brush effect picture based on the pattern extraction area, where a pattern of the first brush effect picture is a pattern corresponding to the pattern extraction area on the display interface; and
  obtaining a second brush effect picture based on the first brush effect picture, where the pattern of the first brush effect picture is the same as a pattern of the second brush effect picture, and definition of the second brush effect picture is greater than definition of the first brush effect picture.

In an optional embodiment, the first brush effect picture and the second brush effect picture are scalar diagrams, and resolution of the second brush effect picture is greater than resolution of the first brush effect picture.

In an optional embodiment, the obtaining a second brush effect picture based on the first brush effect picture includes: obtaining the second brush effect picture based on the first brush effect picture and a mapping relationship between the first brush effect picture and the second brush effect picture.

In an optional embodiment, the obtaining a second brush effect picture based on the first brush effect picture includes: inputting the first brush effect picture into a neural network model that has completed training, to output the second brush effect picture.

In an optional embodiment, the first brush effect picture is a scalar diagram, and the second brush effect picture is a vector diagram.

In an optional embodiment, the obtaining a second brush effect picture based on the first brush effect picture includes: converting the first brush effect picture as the scalar diagram into a vector diagram, to obtain the second brush effect picture.

In an optional embodiment, the obtaining a first brush effect picture based on the pattern extraction area includes: parsing a pattern of the pattern extraction area on the display interface, to obtain the first brush effect picture.

In an optional embodiment, the obtaining a first brush effect picture based on the pattern extraction area includes: parsing a pattern of the pattern extraction area on the display interface; and extracting a minimum repeating unit pattern from the parsed pattern, to obtain the first brush effect picture.

In an optional embodiment, the determining a pattern extraction area on a display interface in response to an area selection operation on the display interface includes: determining, in response to an encircling operation on the display interface, the pattern extraction area on the display interface based on an encircling area of the encircling operation.

In an optional embodiment, the method further includes: storing the second brush effect picture.

In an optional embodiment, the display is a touchscreen, and the method further includes: sending the second brush effect picture to a touch input device.

According to a second aspect, an embodiment of this application provides an image editing method, applied to a terminal device provided with a display, and including:
  generating a second brush effect picture by using the method according to the first aspect, or invoking a first target brush effect picture or a second target brush effect picture, where the first target brush effect picture is any one of second brush effect pictures stored by using the method according to the first aspect, and the second target brush effect picture is any one of second brush effect pictures sent to a touch input device by using the method according to the first aspect; and
  applying the second brush effect picture, the first target brush effect picture, or the second target brush effect picture to a brush, to draw a target image.

In an optional embodiment, the applying the second brush effect picture, the first target brush effect picture, or the second target brush effect picture to a brush, to draw a target image includes: zooming in or zooming out the second brush effect picture, the first target brush effect picture, or the second target brush effect picture in response to a zoom-in or zoom-out operation on a brush effect picture; and applying the zoomed-in or zoomed-out second brush effect picture, the zoomed-in or zoomed-out first target brush effect picture, or the zoomed-in or zoomed-out second target brush effect picture to the brush, to draw the target image.

According to a third aspect, an embodiment of this application provides a method for generating a brush effect picture, applied to a touch input device, where the method includes:
  receiving a second brush effect picture sent by a terminal device; and
  storing the second brush effect picture in the touch input device.

In an optional embodiment, the touch input device includes a display, and the method further includes: displaying the stored second brush effect picture on the display of the touch input device.

According to a fourth aspect, an embodiment of this application provides an image editing method, applied to a touch input device, where the method includes:

sending a second target brush effect picture invoking instruction to a terminal device in response to a second target brush effect picture invoking operation, where the second target brush effect picture invoking instruction is used to instruct the terminal device to invoke a second target brush effect picture, and the second target brush effect picture is any one of second brush effect pictures stored by using the method according to the third aspect.

According to a fifth aspect, an embodiment of this application provides a terminal device, including:

a display;
one or more processors;
a memory; and
one or more computer programs, where the one or more computer programs are stored in the memory, the one or more computer programs include instructions, and when the instructions are executed by the terminal device, the terminal device is enabled to perform the method according to any one of the first aspect or the second aspect.

According to a sixth aspect, an embodiment of this application provides a touch input device, including:

one or more processors;
a memory; and
one or more computer programs, where the one or more computer programs are stored in the memory, the one or more computer programs include instructions, and when the instructions are executed by the terminal device, the terminal device is enabled to perform the method according to any one of the third aspect and the fourth aspect.

According to a seventh aspect, an embodiment of this application provides a computer-readable storage medium. The computer-readable storage medium includes a stored program, and when the program runs, a device in which the computer-readable storage medium is located is controlled to perform the method according to any one of the first aspect or the second aspect.

According to an eighth aspect, an embodiment of this application provides a computer-readable storage medium. The computer-readable storage medium includes a stored program, and when the program runs, a device in which the computer-readable storage medium is located is controlled to perform the method according to any one of the third aspect and the fourth aspect.

A brush effect picture obtained by using the embodiments of this application has high definition, and user experience is improved.

BRIEF DESCRIPTION OF DRAWINGS

To describe technical solutions in embodiments of this application more clearly, the following briefly describes the accompanying drawings for embodiments. It is clear that the accompanying drawings in the following descriptions show merely some embodiments of this application, and a person of ordinary skill in the art may derive other drawings from these accompanying drawings without creative efforts.

DESCRIPTION OF EMBODIMENTS

To better understand the technical solutions of this application, the following describes embodiments of this application in detail with reference to the accompanying drawings.

It should be clear that the described embodiments are merely some rather than all of embodiments of this application. All other embodiments obtained by a person of ordinary skill in the art based on embodiments of this application without creative efforts shall fall within the protection scope of this application.

Terms used in embodiments of this application are merely for the purpose of describing specific embodiments, but are not intended to limit this application. The terms "a", "said" and "the" of singular forms used in embodiments and the appended claims of this application are also intended to include plural forms, unless otherwise specified in the context clearly.

It should be understood that the term "and/or" used in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Before the embodiments of this application are specifically described, a scenario in this application is first briefly described.

Figure 1:
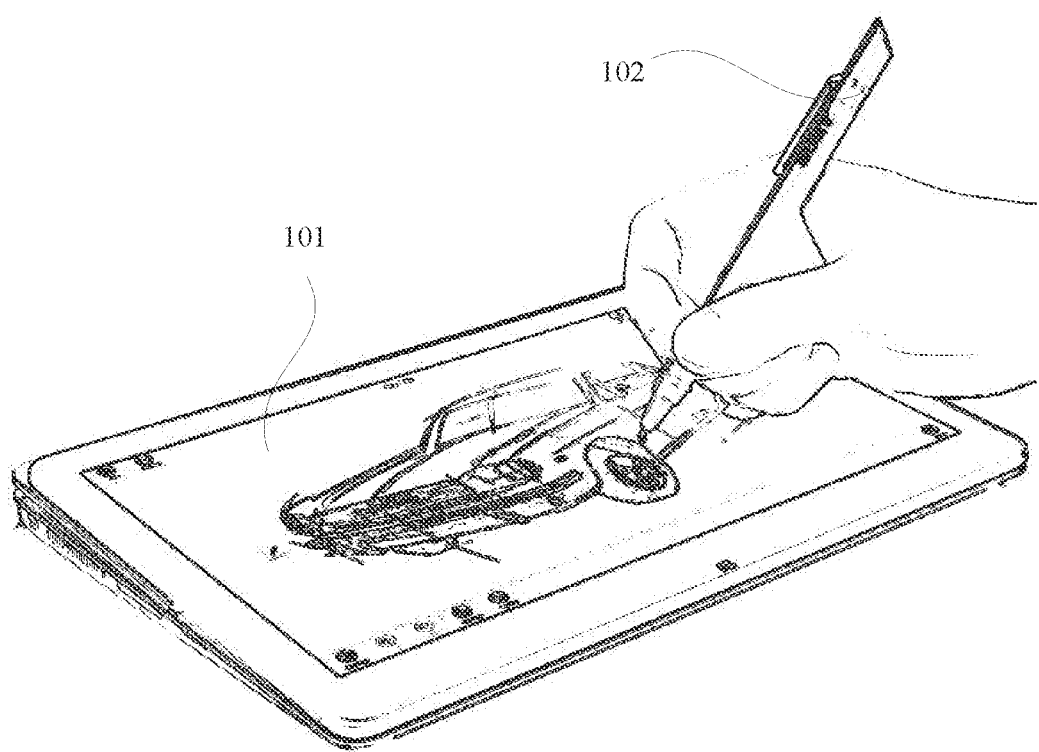
FIG. 1 is a schematic diagram of an application scenario according to an embodiment of this application.

FIG. 1 is a schematic diagram of an application scenario according to an embodiment of this application. As shown in FIG. 1, an electronic device in the embodiments of this application includes a terminal device 101 and a touch input device 102. The terminal device 101 includes a touchscreen. A user may enter an instruction on the touchscreen of the terminal device 101 by using the touch input device 102, to complete a related operation on the terminal device 101. For example, a file may be selected by tapping the touchscreen by using the touch input device 102, or a picture may be drawn by using the touch input device 102.

In addition to inputting the instruction on the touchscreen, the touch input device 102 may further communicate with the terminal device 101 to transmit information. The communication network may be a local area network, or may be a wide area network transferred by a relay (relay) device. When the communication network is the local area network, for example, the communication network may be a near-distance communication network such as a Wi-Fi hotspot network, a Wi-Fi P2P network, a Bluetooth network, a zigbee network, or a near field communication (near field communication, NFC) network. When the communication network is the wide area network, for example, the communication network may be a third generation wireless telephone technology (3rd-generation wireless telephone technology, 3G) network, a fourth generation mobile communication technology (the 4th generation mobile communication technology, 4G) network, a fifth generation mobile communication technology (5th-generation mobile communication technology, 5G) network, a future evolved public land mobile network (public land mobile network, PLMN), or an internet.

It may be understood that, in addition to a tablet computer, the terminal device 101 may be a mobile phone, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, a vehicle-mounted device, a smart car, a smart acoustic system, a robot, smart glasses, or the like.

In some application scenarios provided in the embodiments of this application, the touch input device 102 may not be included. For example, the user inputs an instruction on the touchscreen of the terminal device 101 by using a finger, or inputs a trigger instruction by using an external interface device of the terminal device 101, such as a mouse, a keyboard, or a key.

Figure 2:
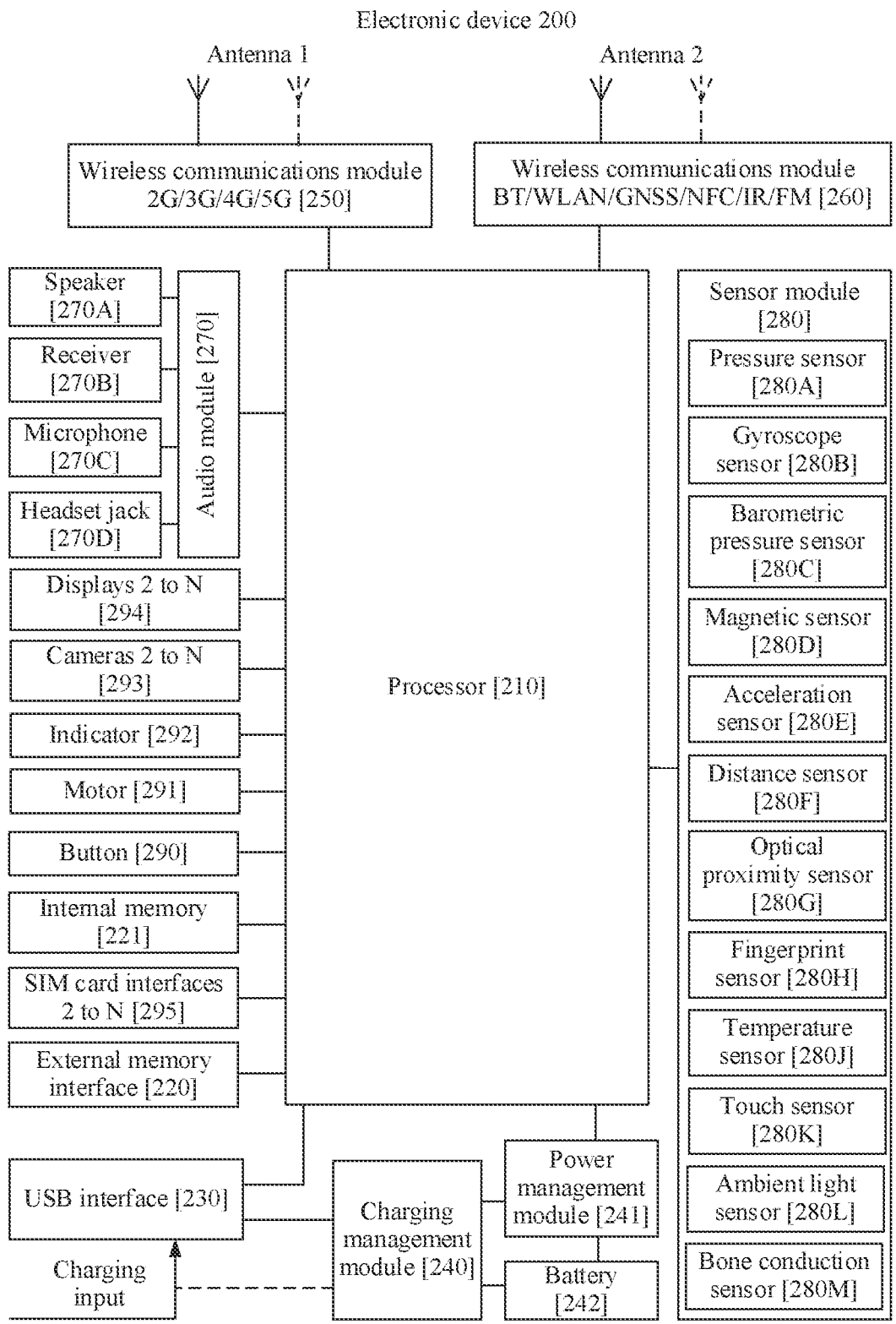
FIG. 2 is a schematic diagram of a structure of an electronic device according to an embodiment of this application.

FIG. 2 is a schematic diagram of a structure of an electronic device 200 according to an embodiment of this application. The electronic device 200 may be the terminal device 101 in FIG. 1.

The electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of the present invention does not constitute a specific limitation on the electronic device 200. In some other embodiments of this application, the electronic device 200 may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data that has been used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 210 may include a plurality of groups of I2C buses. The processor 210 may be separately coupled to the touch sensor 280K, a charger, a flash, the camera 293, and the like by using different I2C bus interfaces. For example, the processor 210 may be coupled to the touch sensor 280K by using the I2C interface, so that the processor 210 communicates with the touch sensor 280K by using the I2C bus interface, to implement a touch function of the electronic device 200.

The I2S interface may be configured to perform audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transmit an audio signal to the wireless communications module 260 through the I2S interface, to implement a function of answering a call through a Bluetooth headset.

The PCM interface may also be used to perform audio communication, and sample, quantize, and code an analog signal. In some embodiments, the audio module 270 may be coupled to the wireless communications module 260 through a PCM bus interface. In some embodiments, the audio module 270 may alternatively transfer an audio signal to the wireless communications module 260 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is generally configured to connect the processor 210 and the wireless communications module 260. For example, the processor 210 communicates with a Bluetooth module in the wireless communications module 260 through the UART interface, to implement a Bluetooth function. In some embodiments, the audio module 270 may transmit an audio signal to the wireless communications module 260 through the UART interface, to implement a function of playing music through a Bluetooth headset.

The MIPI interface may be configured to connect the processor 210 and a peripheral component such as the display 294 or the camera 293. The MIPI interface includes a camera serial interface (camera serial interface, CSI), a display serial interface (display serial interface, DSI), and the like. In some embodiments, the processor 210 communicates with the camera 293 by using the CSI interface, to implement a photographing function of the electronic device 200. The processor 210 communicates with the display 294 by using the DSI interface, to implement a display function of the electronic device 200.

The GPIO interface may be configured by software. The GPIO interface may be configured as a control signal or a data signal. In some embodiments, the GPIO interface may be configured to connect the processor 210 to the camera 293, the display 294, the wireless communications module 260, the audio module 270, the sensor module 280, or the like. The GPIO interface may alternatively be configured as an I2C interface, an I2S interface, a UART interface, an MIPI interface, or the like.

The USB interface 230 is an interface that conforms to a USB standard specification, and may be specifically a mini USB interface, a micro USB interface, a USB Type-C interface, or the like. The USB interface 230 may be configured to connect to a charger to charge the electronic device 200, or may be configured to perform data transmission between the electronic device 200 and a peripheral device, or may be configured to connect to a headset for playing audio through the headset. The interface may be further configured to connect to another electronic device such as an AR device.

It may be understood that an interface connection relationship between the modules that is shown in this embodiment of the present invention is merely an example for description, and does not constitute a limitation on the structure of the electronic device 200. In some other embodiments of this application, the electronic device 200 may alternatively use an interface connection mode different from an interface connection mode in this embodiment, or a combination of a plurality of interface connection modes.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the electronic device 200. The charging management module 240 supplies power to the electronic device by using the power management module 241 while charging the battery 242.

The power management module 241 is configured to connect to the battery 242, the charging management module 240, and the processor 210. The power management module 241 receives an input from the battery 242 and/or the charging management module 240, and supplies power to the processor 210, the internal memory 221, the display 294, the camera 293, the wireless communications module 260, and the like. The power management module 241 may be further configured to monitor parameters such as a battery capacity, a battery cycle count, and a battery health status (an electric leakage or impedance). In some other embodiments, the power management module 241 may alternatively be disposed in the processor 210. In some other embodiments, the power management module 241 and the charging management module 240 may alternatively be disposed in a same device.

A wireless communication function of the electronic device 200 may be implemented by using the antenna 1, the antenna 2, the mobile communications module 250, the wireless communications module 260, the modem processor, the baseband processor, and the like.

The antenna 1 and the antenna 2 are configured to transmit and receive an electromagnetic wave signal Each antenna in the electronic device 200 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 250 may provide a wireless communication solution that includes 2G/3G/4G/5G or the like and that is applied to the electronic device 200. The mobile communications module 250 may include at least one filter, a switch, a power amplifier, a low noise amplifier (low noise amplifier, LNA), and the like. The mobile communications module 250 may receive an electromagnetic wave through the antenna 1, perform processing such as filtering or amplification on the received electromagnetic wave, and transmit the electromagnetic wave to the modem processor for demodulation. The mobile communications module 250 may further amplify a signal modulated by the modem processor, and convert the signal into an electromagnetic wave for radiation through the antenna 1. In some embodiments, at least some functional modules in the mobile communications module 250 may be disposed in the processor 210. In some embodiments, at least some function modules in the mobile communications module 250 may be disposed in a same component as at least some modules in the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and is disposed in a same component as the mobile communications module 250 or another function module.

The wireless communications module 260 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 200. The wireless communications module 260 may be one or more components integrating at least one communications processing module. The wireless communications module 260 receives an electromagnetic wave by the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

In some embodiments, in the electronic device 200, the antenna 1 and the mobile communications module 250 are coupled, and the antenna 2 and the wireless communications module 260 are coupled, so that the electronic device 200 can communicate with a network and another device by using a wireless communications technology. The wireless communications technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access. TD-SCDMA), long term evolution (long term evolution, LTE), BT, a GNSS, a WLAN, NFC, FM, an IR technology, and/or the like. The GNSS may include a global satellite positioning system (global positioning system. GPS), a global navigation satellite system (global navigation satellite system. GLONASS), a BeiDou navigation satellite system (BeiDou navigation satellite system. BDS), a quasi-zenith satellite system (quasi-zenith satellite system, QZSS), and/or a satellite-based enhancement system (satellite-based augmentation system, SBAS).

The electronic device 200 implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode. OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode. QLED), or the like. In some embodiments, the electronic device 200 may include one or N displays 294, where N is a positive integer greater than 1.

The electronic device 200 may implement a photographing function by using the ISP, the camera 293, the video codec, the GPU, the display 294, the application processor, and the like.

The ISP is configured to process data fed back by the camera 293. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 200 may include one or N cameras 293, where N is a positive integer greater than 1.

The digital signal processor is configured to process a digital signal, and may process another digital signal in addition to the digital image signal. For example, when the electronic device 200 selects a frequency, the digital signal processor is configured to perform Fourier transform on frequency energy and the like.

The video codec is configured to compress or decompress a digital video. The electronic device 200 may support one or more video codecs. In this way, the electronic device 200 can play or record videos in a plurality of coding formats, for example, moving picture experts group (moving picture experts group, MPEG)-1, MPEG-2, MPEG-3, and MPEG-4.

The NPU is a neural network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 200, such as image recognition, facial recognition, speech recognition, and text understanding.

The external memory interface 220 may be configured to connect to an external storage card, for example, a Micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store computer-executable program code, and the executable program code includes instructions. The internal memory 222 may include a program storage area and a data storage area. The program storage area may store an operating system, an application required by at least one function (for example, a voice playing function or an image playing function), and the like. The data storage area may store data (such as audio data and a phone book) created when the electronic device 200 is used, and the like. In addition, the internal memory 221 may include a high-speed random-access memory, and may further include a non-volatile memory, for example, at least one magnetic disk storage device, a flash memory device, or a universal flash memory (universal flash storage, UFS). The processor 210 runs the instruction stored in the internal memory 221 and/or the instruction stored in the memory disposed in the processor, to perform various function applications of the electronic device 200 and data processing.

The electronic device 200 may implement an audio function by using the audio module 270, the speaker 270A the receiver 270B, the microphone 270C, the headset jack 270D, the application processor, and the like, for example, music playback and recording.

The audio module 270 is configured to convert digital audio information into an analog audio signal for output, and is also configured to convert an analog audio input into a digital audio signal. The audio module 270 may be further configured to code and decode an audio signal. In some embodiments, the audio module 270 may be disposed in the processor 210, or some function modules in the audio module 270 are disposed in the processor 210.

The speaker 270A, also referred to as a "loudspeaker", is configured to convert an audio electrical signal into a sound signal. The electronic device 200 may listen to music or answer a hands-free call by using the speaker 270A.

The receiver 270B, also referred to as an "earpiece", is configured to convert an audio electrical signal into a sound signal. When the electronic device 200 answers a call or receives voice information, the receiver 270B may be placed close to a human ear to listen to a voice.

The microphone 270C, also referred to as a "mike" or a "mic", is configured to convert a sound signal into an electrical signal. When making a call or sending voice information, a user may make a sound by moving a human mouth close to the microphone 270C to input a sound signal to the microphone 270C. At least one microphone 270C may be disposed in the electronic device 200. In some other embodiments, two microphones 270C may be disposed in the electronic device 200, to collect a sound signal and further implement a noise reduction function. In some other embodiments, three, four, or more microphones 270C may alternatively be disposed in the electronic device 200, to collect a sound signal, reduce noise, identify a sound source, implement a directional recording function, and the like.

The headset jack 270D is configured to connect to a wired headset. The headset jack 270D may be the USB interface 230, or may be a 3.5 mm open mobile electronic device platform (open mobile terminal platform. OMTP) standard interface or a cellular telecommunications industry association of the USA (cellular telecommunications industry association of the USA, CTIA) standard interface.

The pressure sensor 280A is configured to sense a pressure signal, and may convert the pressure signal into an electrical signal. In some embodiments, the pressure sensor 280A may be disposed on the display 294. There are many types of pressure sensor 280A,
such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The electronic device 200 determines pressure intensity based on the change of the capacitance. When a touch operation is performed on the display 294, the electronic device 200 detects intensity of the touch operation based on the pressure sensor 280A. The electronic device 200 may also calculate a touch location based on a detection signal of the pressure sensor 280A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 280B may be configured to determine a motion posture of the electronic device 200. In some embodiments, an angular velocity of the electronic device 200 around three axes (namely, x, y, and z axes) may be determined by using the gyroscope sensor 280B. The gyroscope sensor 280B may be configured to implement image stabilization during photographing. For example, when the shutter is pressed, the gyroscope sensor 280B detects an angle at which the electronic device 200 jitters, obtains, through calculation based on the angle, a distance for which a lens module needs to compensate, and allows the lens to cancel the jitter of the electronic device 200 through reverse motion, to implement image stabilization. The gyroscope sensor 280B may also be used in a navigation scenario and a somatic game scenario.

The barometric pressure sensor 280C is configured to measure barometric pressure. In some embodiments, the electronic device 200 calculates an altitude by using a value of the atmospheric pressure measured by the barometric pressure sensor 280C, to assist positioning and navigation.

The magnetic sensor 280D includes a Hall effect sensor. The electronic device 200 may detect opening and closing of a flip leather case by using the magnetic sensor 280D. In some embodiments, when the electronic device 200 is a clamshell phone, the electronic device 200 may detect opening and closing of a flip cover based on the magnetic sensor 280D. Further, a feature such as automatic unlocking of the flip cover is set based on a detected opening or closing state of the leather case or a detected opening or closing state of the flip cover.

The acceleration sensor 280E may detect magnitudes of accelerations in various directions (usually on three axes) of the electronic device 200, and may detect a magnitude and a direction of the gravity when the electronic device 200 is still. The acceleration sensor 280E may be further configured to identify a posture of the electronic device, and is used in an application such as switching between a landscape mode and a portrait mode or a pedometer.

The distance sensor 280F is configured to measure a distance. The electronic device 200 may measure the distance through infrared or laser. In some embodiments, in a shooting scenario, the electronic device 200 may perform ranging by using the distance sensor 280F to implement fast focusing.

The optical proximity sensor 280G may include a light emitting diode (LED) and an optical detector, for example, a photodiode. The light emitting diode may be an infrared light emitting diode. The electronic device 200 emits infrared light by using the light emitting diode. The electronic device 200 detects infrared reflected light from a nearby object by using the photodiode. When detecting sufficient reflected light, the electronic device 200 may determine that there is an object near the electronic device 200. When detecting insufficient reflected light, the electronic device 200 may determine that there is no object near the electronic device 200. The electronic device 200 may detect, by using the optical proximity sensor 280G, that a user holds the electronic device 200 close to an ear to make a call, to automatically turn off a screen for power saving. The optical proximity sensor 280G may also be used for automatic screen unlocking and locking in a smart cover mode or a pocket mode.

The ambient light sensor 280L is configured to sense ambient light luminance. The electronic device 200 may adaptively adjust luminance of the display 294 based on the sensed ambient light luminance. The ambient light sensor 280L may also be configured to automatically adjust white balance during photographing. The ambient light sensor 280L may also cooperate with the optical proximity sensor 280G to detect whether the electronic device 200 is in a pocket to prevent an accidental touch.

The fingerprint sensor 280H is configured to collect a fingerprint. The electronic device 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the electronic device 200 executes a temperature processing policy by using the temperature detected by the temperature sensor 280J. For example, when the temperature reported by the temperature sensor 2803 exceeds a threshold, the electronic device 200 lowers performance of a processor located near the temperature sensor 280J, to reduce power consumption and implement thermal protection. In some other embodiments, when the temperature is less than another threshold, the electronic device 200 heats the battery 242, to avoid a case in which the electronic device 200 is shut down abnormally due to a low temperature. In some other embodiments, when the temperature is less than still another threshold, the electronic device 200 boosts an output voltage of the battery 242, to avoid an abnormal shutdown caused by a low temperature.

The touch sensor 280K is also referred to as a "touch control device". The touch sensor 280K may be disposed in the display 294, and the touch sensor 280K and the display 294 form a touchscreen, which is also referred to as a "touch control screen". The touch sensor 280K is configured to detect a touch operation performed on or near the touch sensor 280K. The touch sensor may transfer the detected touch operation to the application processor to determine a type of the touch event. Visual output related to the touch operation may be provided by using the display 294. In some other embodiments, the touch sensor 280K may alternatively be disposed on a surface of the electronic device 200, or disposed in a position different from the display 294.

The bone conduction sensor 280M may obtain a vibration signal. In some embodiments, the bone conduction sensor 280M may obtain a vibration signal of a vibration bone of a human vocal-cord part. The bone conduction sensor 280M may also contact a pulse of a human body and receive a blood pressure pulse signal. In some embodiments, the bone conduction sensor 280M may also be disposed in the headset, to combine into a bone conduction headset. The audio module 270 may obtain a voice signal through parsing based on the vibration signal that is of the vibration bone of the vocal-cord part and that is obtained by the bone conduction sensor 280M, to implement a voice function. The application processor may parse heart rate information based on the blood pressure beating signal obtained by the bone conduction sensor 280M, to implement a heart rate detection function.

The button 290 includes a power button, a volume button, and the like. The button 290 may be a mechanical button, or may be a touch button. The electronic device 200 may receive a button input, and generate a button signal input related to a user setting and function control of the electronic device 200.

The motor 291 may generate a vibration prompt. The motor 291 may be configured to provide an incoming call vibration prompt and a touch vibration feedback. For example, touch operations performed on different applications (for example, photographing and audio playback) may correspond to different vibration feedback effects. The motor 291 may also generate different vibration feedback effects for touch operations performed on different areas of the display 294. Different application scenarios (for example, a time reminder, information receiving, an alarm clock, and a game) may also correspond to different vibration feedback effects. A touch vibration feedback effect may be further customized.

The indicator 292 may be an indicator light, and may be configured to indicate a charging status and a power change, or may be configured to indicate a message, a missed call, a notification, or the like.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The electronic device 200 interacts with a network by using the SIM card, to implement a call function, a data communication function, and the like. In some embodiments, the electronic device 200 uses an eSIM, that is, an embedded SIM card. The eSIM card may be embedded into the electronic device 200, and cannot be separated from the electronic device 200.

Figure 3:
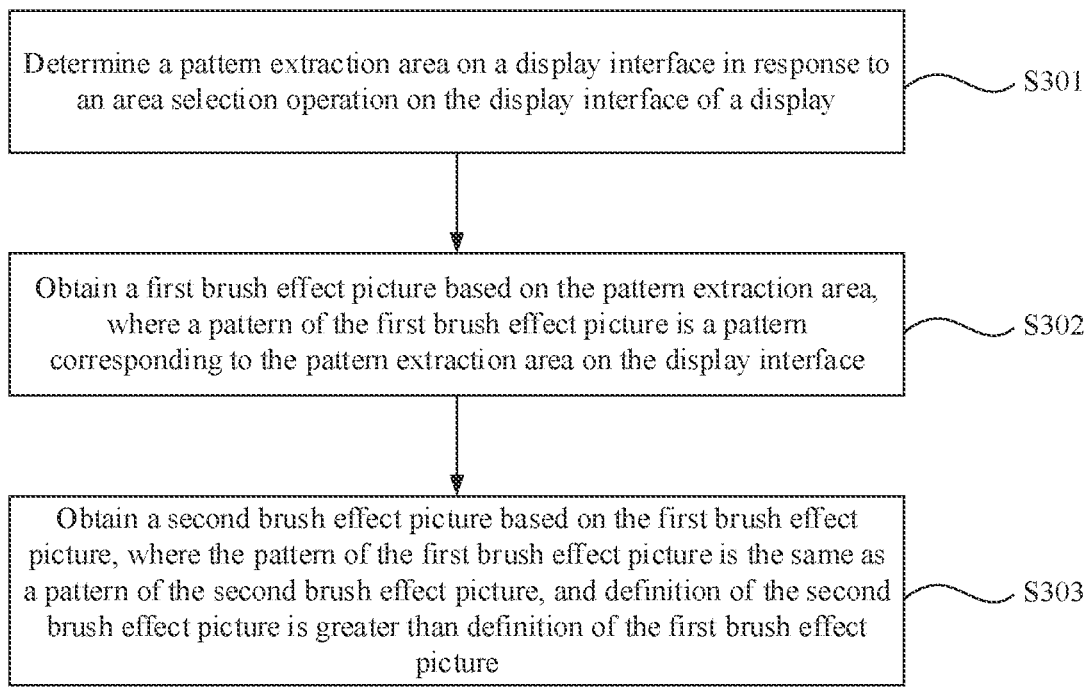
FIG. 3 is a schematic flowchart of a method for generating a brush effect picture according to an embodiment of this application.

FIG. 3 is a schematic flowchart of a method for generating a brush effect picture according to an embodiment of this application. The method may be applied to the terminal devices shown in FIG. 1 and FIG. 2, and mainly includes the following steps.

Step S301: Determine a pattern extraction area on a display interface in response to an area selection operation on the display interface of a display.

It can be understood that, in an actual application scenario, before an operation of generating a brush effect picture is performed, the terminal device needs to be triggered to enter a brush effect picture generation mode. The terminal device may, be triggered to enter the brush effect picture generation mode by using a touchscreen or a key of the terminal device, or by entering an instruction by using a key on the touch input device.

Figure 4:
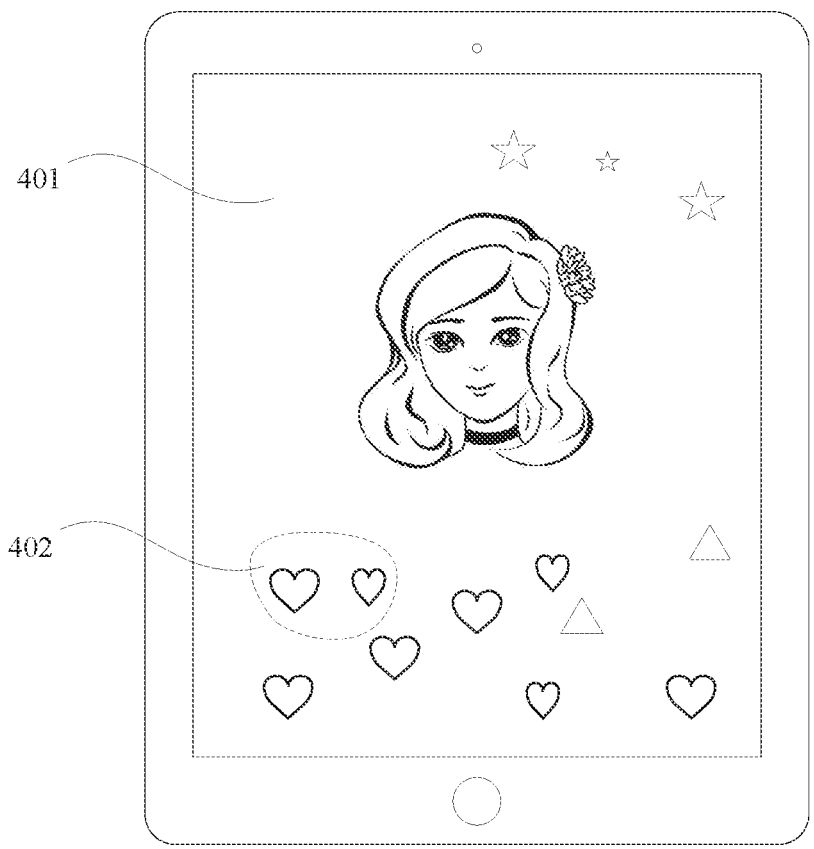
FIG. 4 is a schematic diagram of a display interface according to an embodiment of this application.

FIG. 4 is a schematic diagram of a display interface according to an embodiment of this application. FIG. 4 shows a display interface 401 of the terminal device and a pattern extraction area 402 on the display interface 401. In an optional embodiment, the area selection operation may be an encircling operation performed by the user on the display interface 401. Specifically, the user uses a stylus to touch and hold on the touchscreen and slides on the touchscreen at the same time, and the terminal device generates the pattern extraction area 402 based on a sliding path of the stylus.

It can be understood that the pattern extraction area 402 is a closed area enclosed by the sliding path. However, in an actual operation, it is not easy for a user to draw a completely closed area on the touchscreen. In this embodiment of this application, to improve operation convenience, when the sliding path is not closed or has a cross, the terminal device fits the sliding path that is not closed or has a cross as a closed path, and uses the fitted closed path as the pattern extraction area 402.

In addition, to improve a sense of substitution of the user when the user uses the terminal device, when the user slides on the touchscreen, the display interface 401 displays a sliding path of the user and a closed path fitted by the terminal device in real time when the sliding is completed.

It may be understood that a person skilled in the art may further determine the pattern extraction area in another manner. For example, the user performs tapping touch control on the touchscreen, and the terminal device performs fitting on the display interface to obtain a closed area based on a tapping position, and uses the closed area as the pattern extraction area 402. When there is only one tapping position, a circular area with the tapping position as a center may be used as the pattern extraction area 402. A radius of the circular area may be adjusted based on an actual requirement. This is not limited in this embodiment of this application.

Step S302: Obtain a first brush effect picture based on the pattern extraction area, where a pattern of the first brush effect picture is a pattern corresponding to the pattern extraction area on the display interface.

In this embodiment of this application, after the pattern extraction area is determined, an image in the pattern extraction area on the display interface is parsed to obtain the first brush effect picture, where the first brush effect picture is display content in the pattern extraction area on the display interface. It may be understood that the first brush effect picture is a scalar diagram.

Step S303: Obtain a second brush effect picture based on the first brush effect picture, where the pattern of the first brush effect picture is the same as a pattern of the second brush effect picture, and definition of the second brush effect picture is greater than definition of the first brush effect picture.

In an actual application scenario, the user may need to zoom in on a brush effect picture. For example, the user zooms in on a heart-shaped pattern in FIG. 4 and then brushes the heart-shaped pattern to another position on the display interface 401. However, a problem of blurring likely exists after the scalar diagram is zoomed in.

Figure 5:
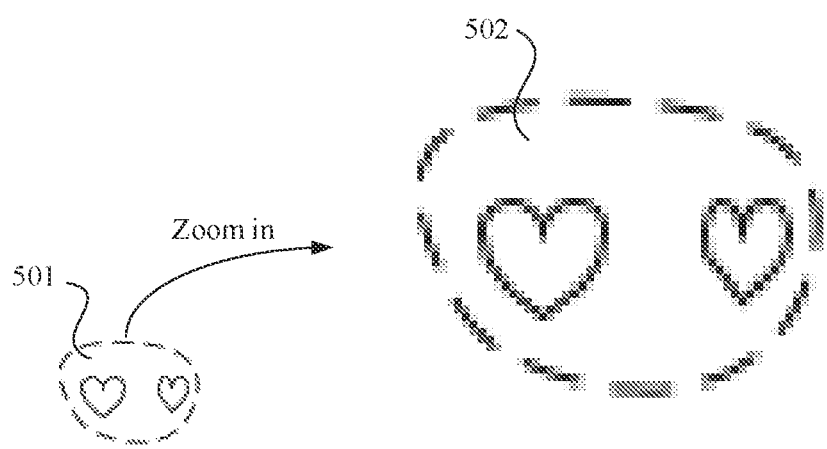
FIG. 5 is a schematic diagram of a brush effect picture according to an embodiment of this application.

FIG. 5 is a schematic diagram of a brush effect picture according to an embodiment of this application. FIG. 5 shows a first brush effect picture 501 and a first brush effect picture 502, where the first brush effect picture 501 is a first brush effect picture before zoom-in, and the first brush effect picture 502 is a first brush effect picture after zoom-in. As shown in FIG. 5, after the first brush effect picture is zoomed in, a pattern becomes blurred, and cannot meet a requirement of the user.

For this problem, in this embodiment of this application, after the first brush effect picture is obtained, the second brush effect picture with higher definition is obtained based on the first brush effect picture. Compared with the first brush effect picture, the second brush effect picture has the higher definition than the first brush effect picture, and the second brush effect picture and the first brush effect picture have a same pattern or texture.

Figure 6:
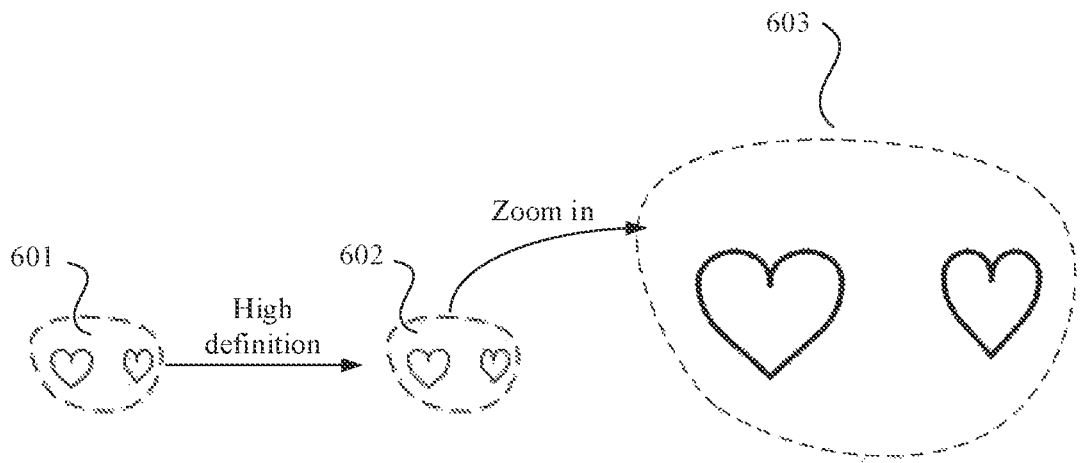
FIG. 6 is a schematic diagram of another brush effect picture according to an embodiment of this application.

FIG. 6 is a schematic diagram of another brush effect picture according to an embodiment of this application. FIG. 6 shows a first brush effect picture 601, a second brush effect picture 602, and a second brush effect picture 603, where the second brush effect picture 602 is a second brush effect picture before zoom-in, and the second brush effect picture 603 is a second brush effect picture after zoom-in. As shown in FIG. 6, because the definition of the second brush effect picture is high, after the second brush effect picture is zoomed in, the definition of the second brush effect picture is still high.

To achieve the foregoing effects, this application provides two implementations. In a first implementation, a scalar diagram with higher resolution is obtained by using the first brush effect picture as the second brush effect picture, to improve the definition of the second brush effect picture. In a second implementation, the first brush effect picture is converted into a vector diagram, to obtain the second brush effect picture. Details are described in the following.

The first implementation may specifically include: training a neural network model by using a large quantity of high-definition pattern and low-definition pattern data groups, to obtain a neural network model that has been trained, inputting a first brush effect picture with low resolution into the neural network model that has been trained, and outputting a second brush effect picture with high resolution. It should be noted that the resolution herein is a relative concept, and means that the resolution of the second brush effect picture is higher than the resolution of the first brush effect picture. In addition, in addition to using the neural network model, a person skilled in the art may alternatively use other technical means to obtain a mapping relationship between a high-definition pattern and a low-definition pattern, that is, the mapping relationship between the first brush effect picture and the second brush effect picture, and then obtain the second brush effect picture based on the first brush effect picture and the mapping relationship between the first brush effect picture and the second brush effect picture. The invention shall fall within the protection scope of this application without departing from the inventive concept of this application.

The second implementation may specifically include: obtaining an edge contour diagram of the pattern in the first brush effect picture by linearizing the first brush effect picture; obtaining edge contour points in the edge contour diagram, where consecutive edge contour points form a polygon; performing curve fitting on each point of the polygon; and drawing a fitted polygon, and performing color filling to obtain the vector diagram of the first brush effect picture, where the vector diagram is the second brush effect picture. It may be understood that the vector diagram is not distorted after zoom in. Therefore, the definition of the second brush effect picture is higher than the definition of the first brush effect picture. In addition, the foregoing manner of converting the scalar diagram into the vector diagram is merely a specific implementation means listed in this embodiment of this application. A person skilled in the art may implement vectorization of the scalar diagram by using another technical mean. This is not limited in this embodiment of this application.

The brush effect picture obtained by using the embodiments of this application has high definition, thereby improving user experience.

Figure 7:
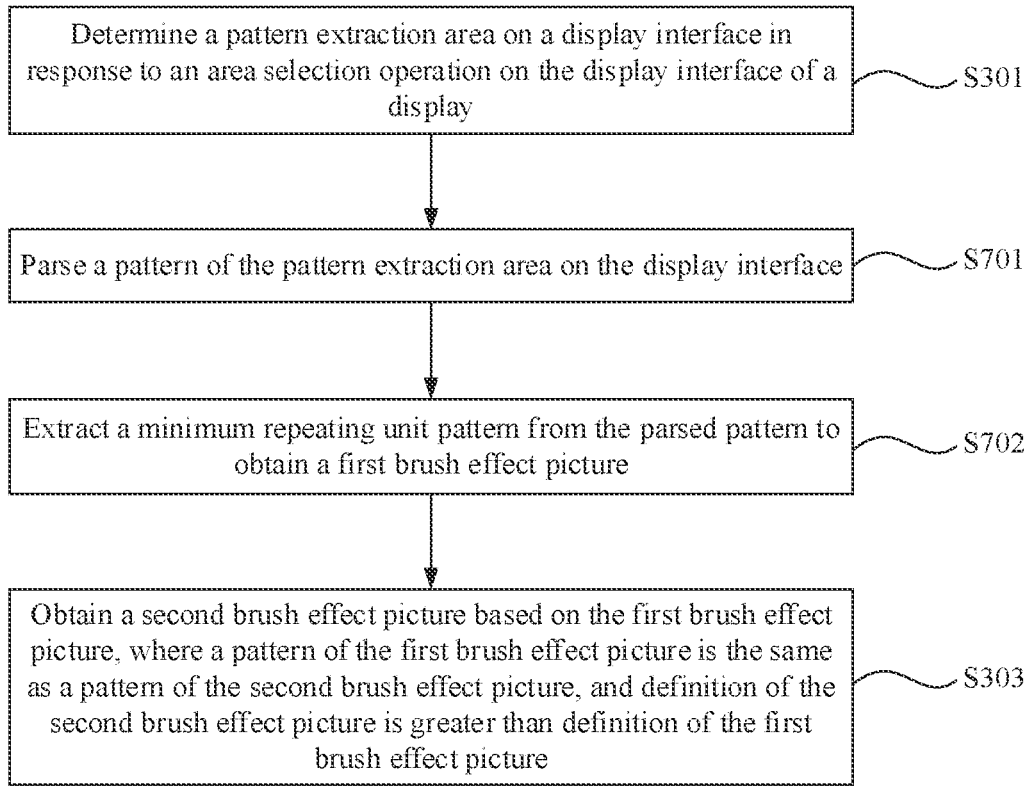
FIG. 7 is a schematic flowchart of another method for generating a brush effect picture according to an embodiment of this application.

FIG. 7 is a schematic flowchart of another method for generating a brush effect picture according to an embodiment of this application. The method is extended on the basis of the embodiment shown in FIG. 3. Step S302 in FIG. 3: Obtain a first brush effect picture based on the pattern extraction area, which specifically includes the following steps.

Step S701: Parse a pattern of the pattern extraction area on the display interface.

Step S702: Extract a minimum repeating unit pattern from the parsed pattern, to obtain the first brush effect picture.

It may be understood that when the user extracts a brush effect pattern on the display interface, there are usually a large quantity of repeating pattern units on the display interface. For example, grass in a grassland image, a wave flower in a sea image, and a wood texture in a furniture image. In this case, generally, only the minimum repeating unit pattern needs to be obtained, to meet a requirement of the user for a brush. In addition, by extracting the minimum repeating unit pattern, effect of an edge on the brush effect picture can be reduced.

Figure 8:
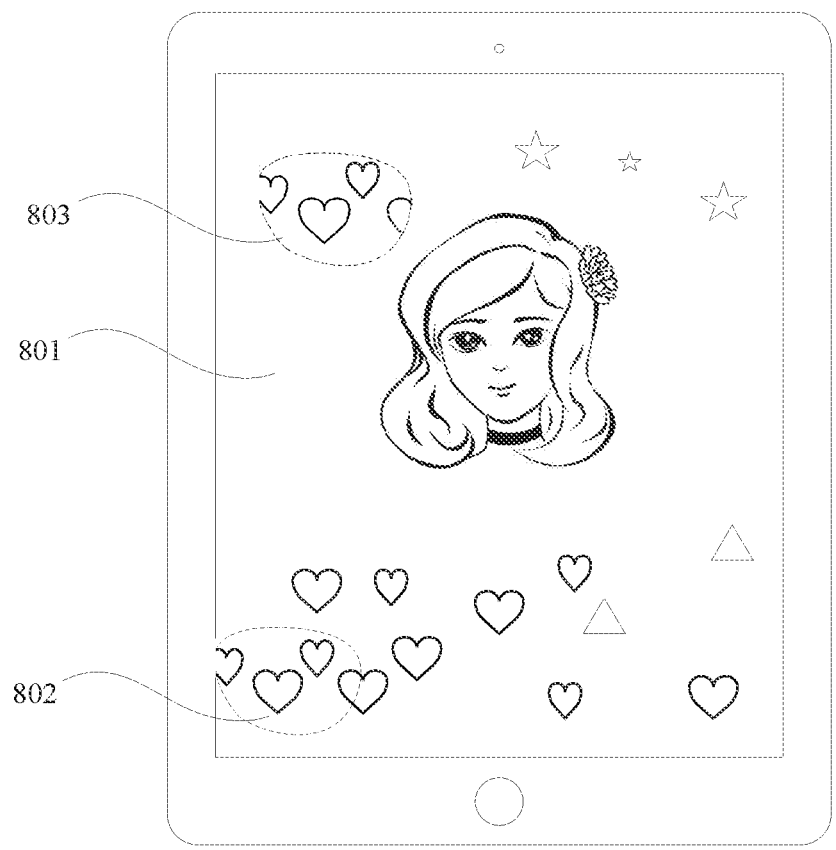
FIG. 8 is a schematic diagram of another display interface according to an embodiment of this application.

FIG. 8 is a schematic diagram of another display interface according to an embodiment of this application. FIG. 8 shows a display interface 801 and a pattern extraction area 802. The pattern extraction area 802 covers one complete "heart-shaped" pattern and two incomplete "heart-shaped" patterns on the display interface 801. If an image corresponding to the pattern extraction area 802 on the display interface 801 is directly used as a brush effect picture, a brush is used to draw on the display interface, and an effect thereof is shown in a brush drawing pattern 803. There are two incomplete "heart-shaped" patterns in the brush drawing pattern 803. It is clearly that the brush drawing pattern 803 is not a brush effect pattern desired by the user.

Therefore, in this embodiment of this application, after the pattern of the pattern extraction area on the display interface is parsed, a pattern of a minimum repetition unit is extracted from the parsed pattern, and the pattern of the minimum repetition unit is used as the first brush effect picture.

Figure 9:
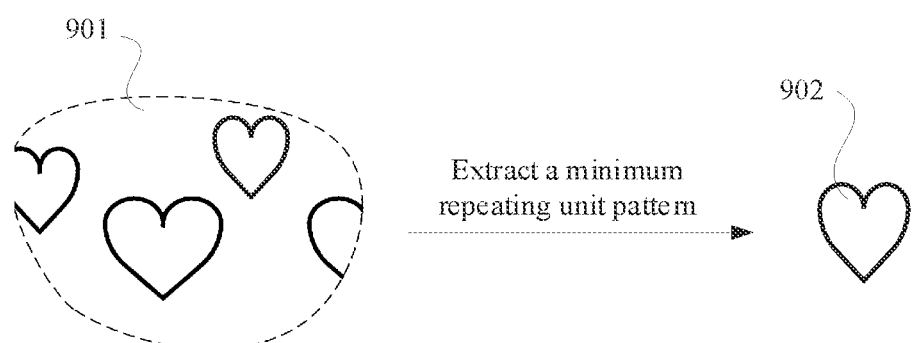
FIG. 9 is a schematic diagram of extracting a minimum repeating unit pattern according to an embodiment of this application.

FIG. 9 is a schematic diagram of extracting a minimum repeating unit pattern according to an embodiment of this application. After the pattern extraction area 802 in the embodiment shown in FIG. 8 is parsed, a parsed image 901 is obtained. The parsed image 901 corresponds to an image of the pattern extraction area 802 on the display interface 801. The minimum repeating unit pattern 902 extracted from the parsed image 901 is a complete "heart-shaped" pattern. When applying the brush effect picture, the user may draw the "heart-shaped" pattern at another position of the display interface by using the brush.

In an optional embodiment, extension is performed based on the embodiment shown in FIG. 4 or FIG. 7. After step S303, the method further includes a step of storing the second brush effect picture.

In an actual application scenario, after drawing is completed by using the current brush effect picture, the user may need to use the brush effect picture after a period of time. If a pattern extraction area needs to be selected on the display interface to regenerate a brush effect picture each time before the brush effect picture is used for drawing, operations are complex, user experience is affected, and performance overheads of the terminal device are increased.

Based on this, in this embodiment of this application, after the second brush effect picture is obtained, the second brush effect picture is stored in the terminal device. During subsequent use, the stored second brush effect picture is directly invoked.

Figure 10:
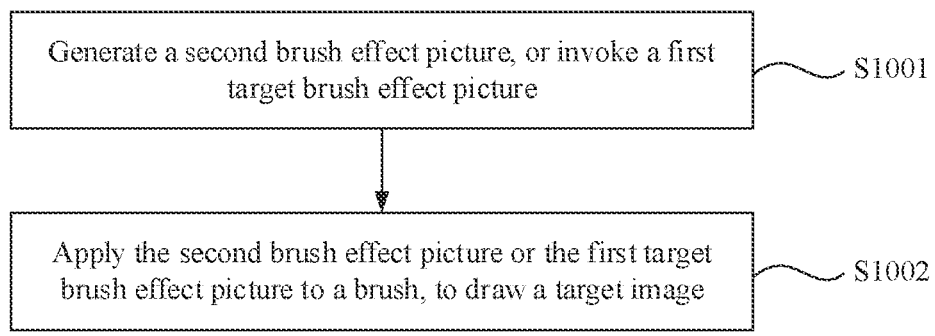
FIG. 10 is a schematic flowchart of an image editing method according to an embodiment of this application.

Based on the foregoing method for generating a brush effect picture, an embodiment of this application further provides an image editing method. FIG. 10 is a schematic flowchart of an image editing method according to an embodiment of this application. The method may be applied to the terminal devices shown in FIG. 1 and FIG. 2, and mainly includes the following steps.

Step S1001: Generate a second brush effect picture, or invoke a first target brush effect picture.

Specifically, the second brush effect picture is a second brush effect picture generated by using any method in the foregoing embodiment, and the first target brush effect picture is any one of second brush effect pictures stored in the terminal device. When the user uses the brush to perform drawing, the user may enter a brush effect picture generation mode to produce a brush effect picture, and the user may directly select a brush effect picture from the second brush effect pictures stored in the terminal device for use.

Figure 11:
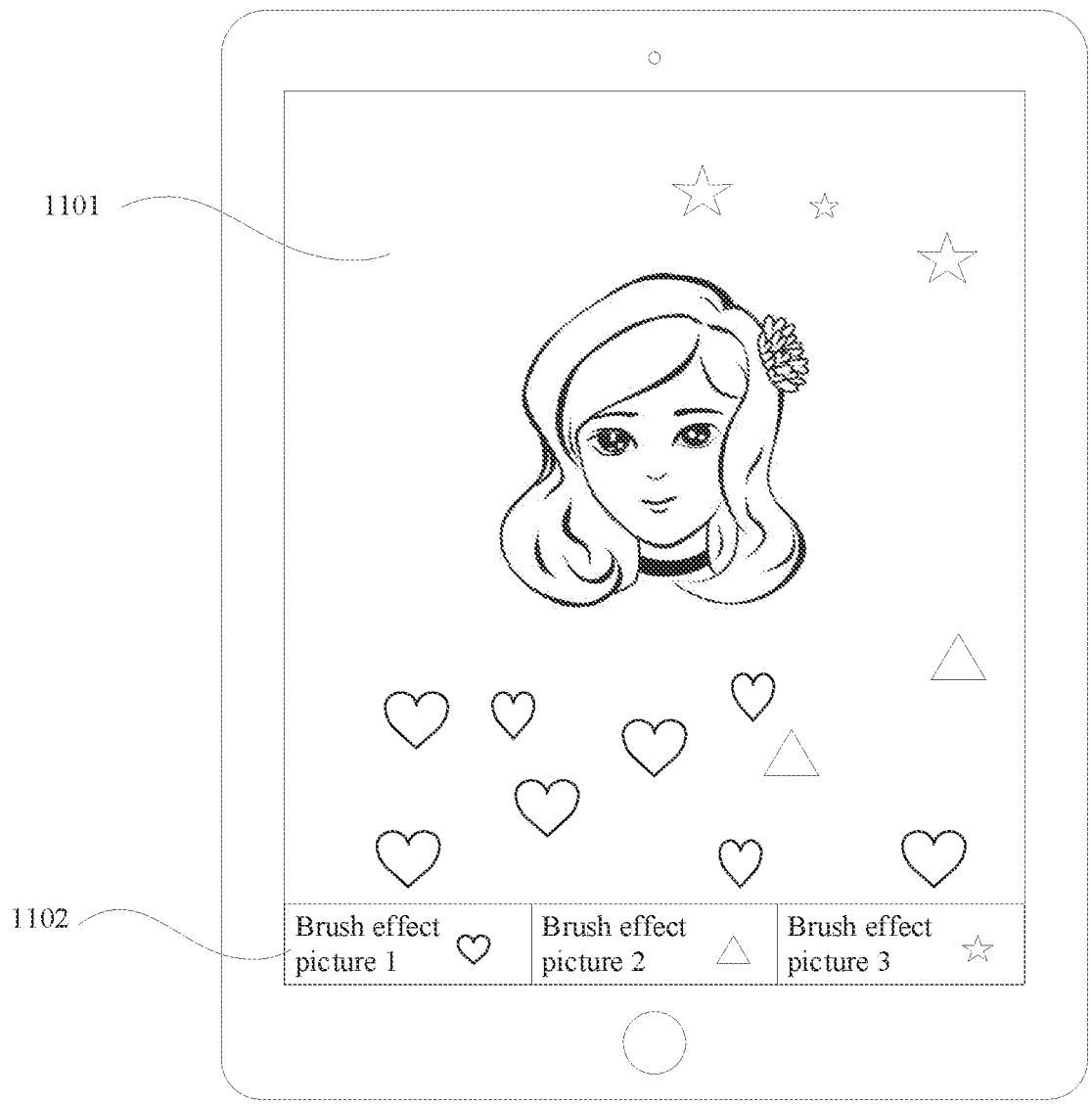
FIG. 11 is a schematic diagram of another display interface according to an embodiment of this application.

FIG. 11 is a schematic diagram of another display interface according to an embodiment of this application. FIG. 11 shows a display interface 1101 and a brush effect picture control 1102. The brush effect picture control 1102 is configured to identify a brush effect picture stored by a user in a terminal device. For example, a brush effect picture 1 is a "heart-shaped" pattern, a brush effect picture 2 is a "triangle" pattern, and a brush effect picture 3 is a "pentagon star" pattern.

When the user performs drawing by using a brush, the user may enter the brush effect picture generation mode to produce a brush effect picture, and the user may select a stored brush effect picture from the brush effect picture control 1102 by tapping the brush effect picture control 1102. For example, an area corresponding to the brush effect picture 2 is tapped, and the "triangle" pattern is selected as a brush effect picture of a current brush.

Step S1002: Apply the second brush effect picture or the first target brush effect picture to a brush, to draw a target image.

If the user enters the brush effect picture generation mode, the generated second brush effect picture is applied to the brush based on an area selection operation of the user, and the target graphic is drawn. Alternatively, if the user invokes stored second brush effect pictures, a corresponding first target brush effect picture is applied to the brush based on an operation of the user, to draw the target image.

In addition, before drawing the target image by using the brush, the user may further perform a zoom-in or zoom-out operation on the brush effect picture, to draw a brush effect pattern of a corresponding size in the target image. Specifically, in response to the zoom-in or zoom-out operation on the brush effect picture, the second brush effect picture is zoomed in or zoomed out; and the brush effect picture obtained after the zoom-in or zoom-out is applied to the brush, to draw the target image.

Figure 12:
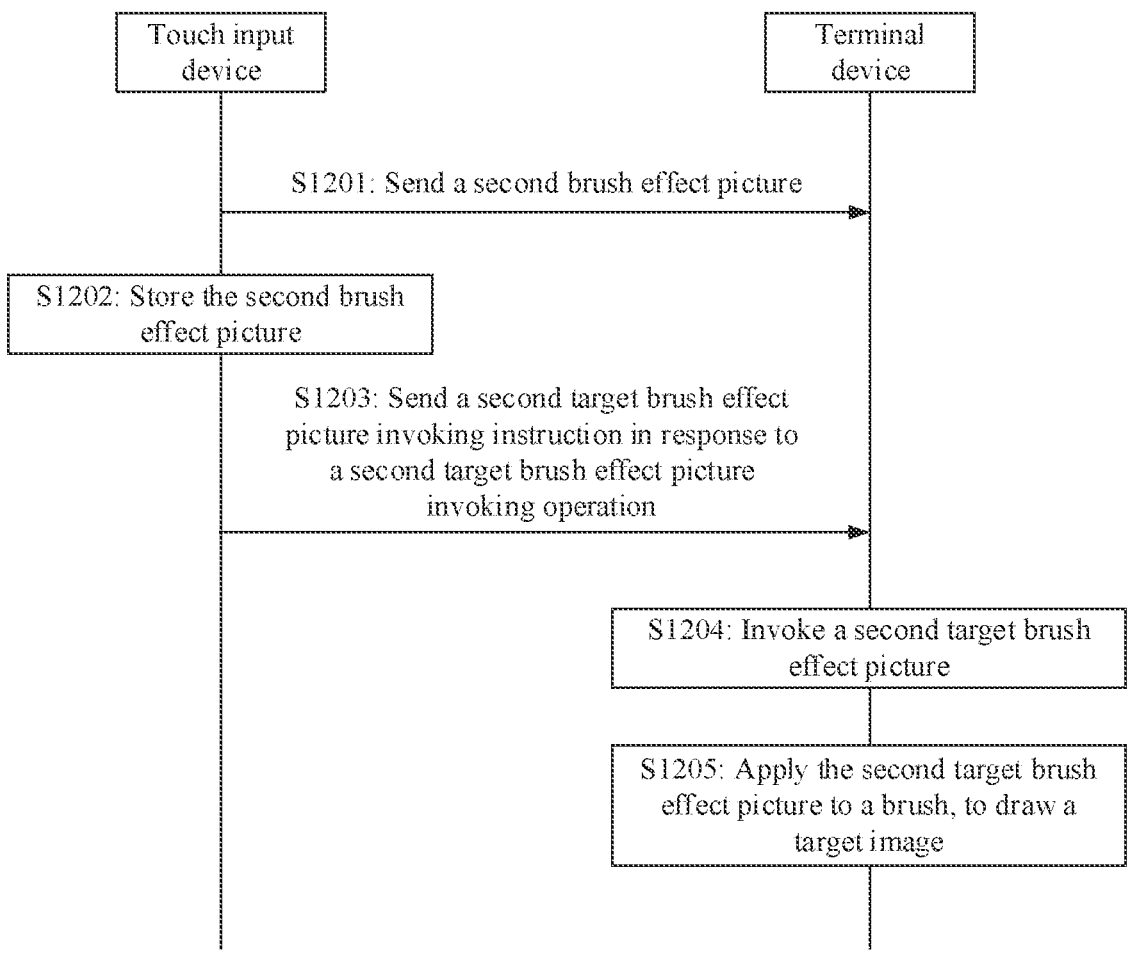
FIG. 12 is a schematic flowchart of an image editing method according to an embodiment of this application.

FIG. 12 is a schematic flowchart of an image editing method according to an embodiment of this application. The method may be applied to the terminal device and the touch input device shown in FIG. 1 and FIG. 2, and mainly includes the following steps.

Step S1201: The terminal device sends a second brush effect picture to the touch input device.

After the second brush effect picture is generated by using the method in the embodiment in FIG. 3 or FIG. 7, m addition to storing the second brush effect picture in the terminal device, the second brush effect picture may be further sent to the touch input device, and the second brush effect picture is stored in the touch input device.

Step S1202: The touch input device stores the second brush effect picture.

After receiving the second brush effect picture sent by the terminal device, the touch input device stores the second brush effect picture in the touch input device.

Step S1203: The touch input device sends a second target brush effect picture invoking instruction to the terminal device in response to a second target brush effect picture invoking operation.

Specifically, the second target brush effect picture invoking instruction includes identification information of a brush effect picture, and the terminal device may determine, by using the identification information, a second brush effect picture that needs to be invoked. The user may trigger the second target brush effect picture invoking operation by using a key on the touch input device.

In an optional embodiment, a display is disposed on the touch input device, and the touch input device may display the second brush effect picture by using the display, so that the user filters the second brush effect picture to be invoked. For example, the display is a touchscreen. As a finger of the user slides on the touchscreen, the second brush effect picture displayed on the touchscreen is continuously switched. When the user taps the screen, the second target brush effect picture invoking instruction is triggered, and the second brush effect picture currently displayed on the display is invoked.

Step S1204: The terminal device invokes a second target brush effect picture.

After receiving the second target brush effect picture invoking instruction, the terminal device invokes a corresponding second brush effect picture based on the identification information in the second target brush effect picture invoking instruction.

Step S1205: The terminal device applies the second target brush effect picture to a brush, to draw a target image.

In this embodiment of this application, the terminal device sends the brush effect picture to the touch input device for backup, and the touch input device may trigger an operation of invoking the brush effect picture.

Figure 13:
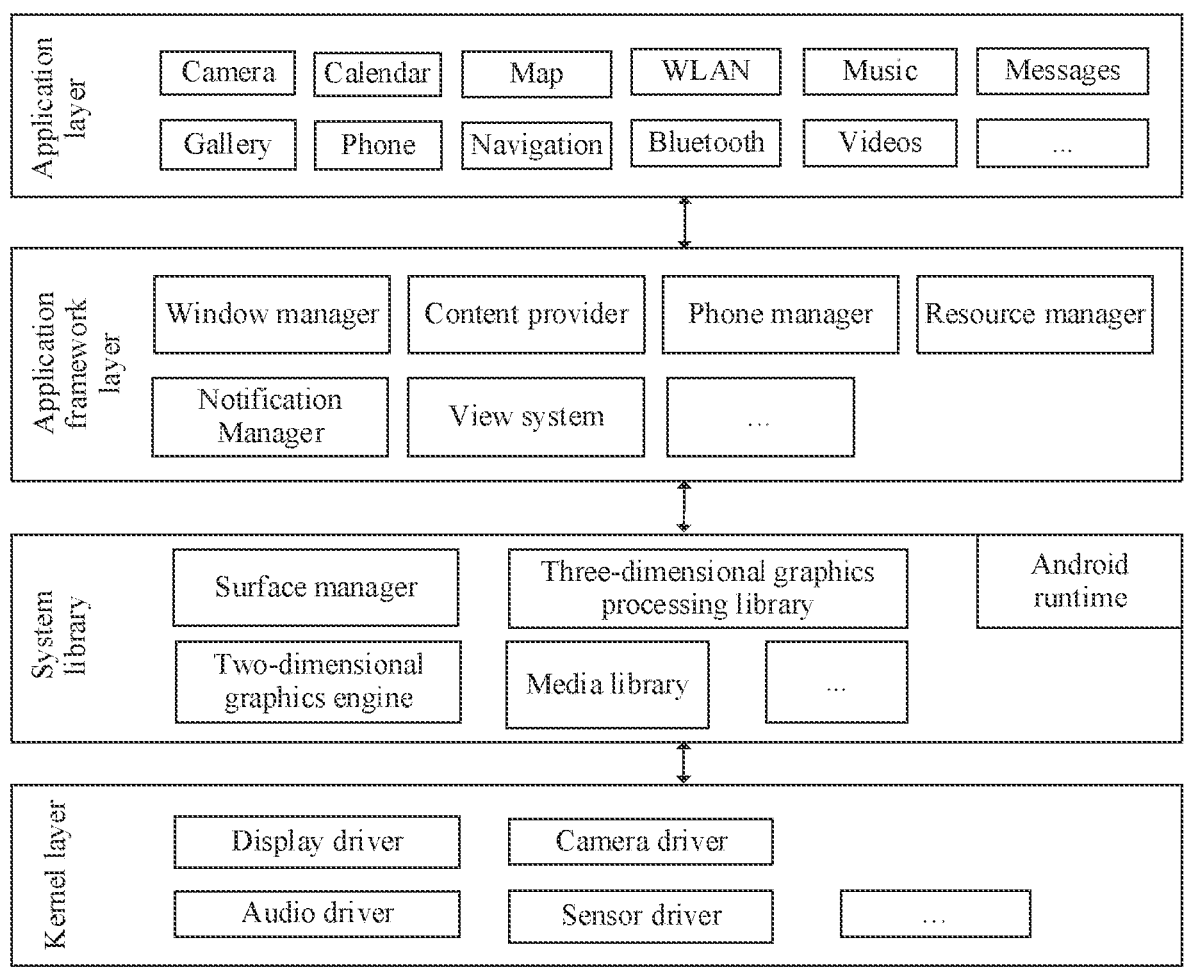
FIG. 13 is a block diagram of a software structure of an electronic device according to an embodiment of this application.

FIG. 13 is a block diagram of a software structure of an electronic device according to an embodiment of this application.

As shown in FIG. 13, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The method provided in this embodiment of this application may be implemented by using an application at the application layer, or may be implemented by using a bottom layer of an operating system, for example, the kernel layer, the system library, and/or the application framework layer. When the foregoing method is implemented based on the bottom layer of the operating system, cross-application use may be implemented.

Figure 14A:
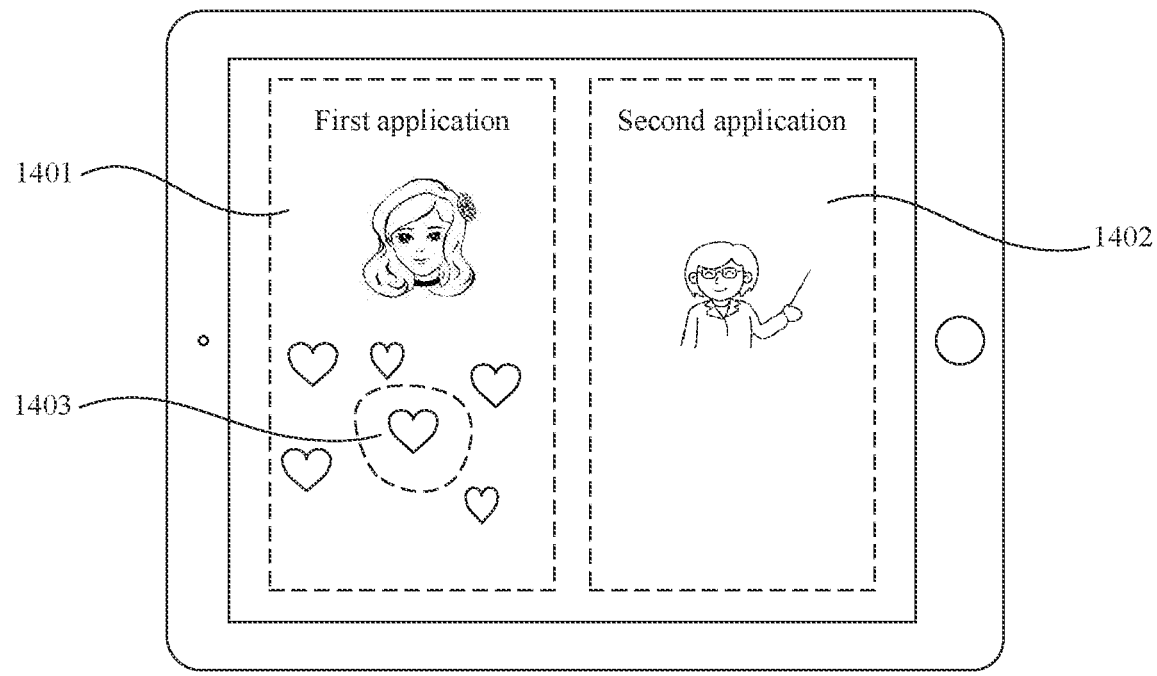
FIG. 14a and FIG. 14b are schematic diagrams of another display interface according to an embodiment of this application.
Figure 14B:
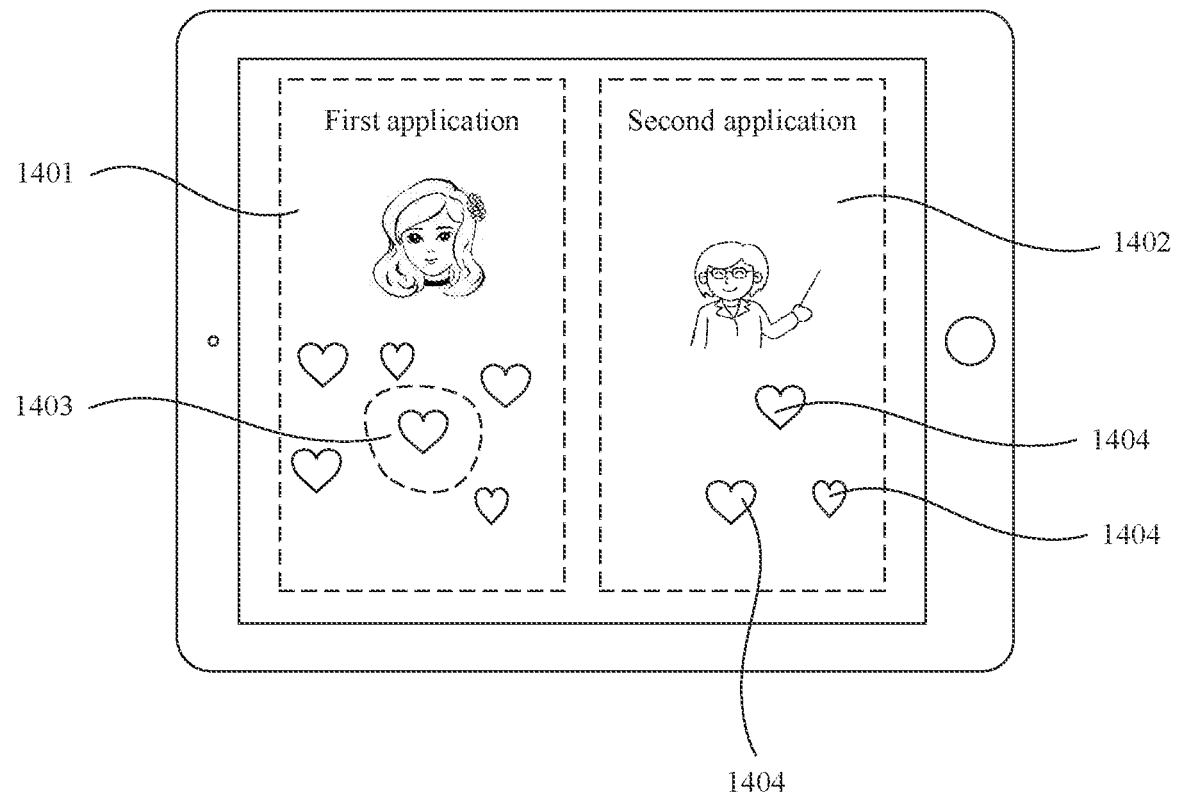

FIG. 14a and FIG. 14b are schematic diagrams of another display interface according to an embodiment of this application. FIG. 14a shows a first application window 1401 and a second application window 1402. A user determines a pattern extraction area 1403 in the first application window 1401 by performing an encircling operation, and a terminal device generates a second brush effect picture based on the pattern extraction area 1403. It may be understood that the second brush effect picture includes a "heart-shaped" pattern. The user adds the second brush effect picture to the second application window 1402 by using the brush, and generates a brush drawing pattern 1404 in the second application window 1402.

During specific implementation, an embodiment of this application further provides a terminal device. The terminal device includes a display, one or more processors, a memory, and one or more computer programs. The one or more computer programs are stored in the memory, the one or more computer programs include instructions, and when the instructions are executed by the terminal device, the terminal device performs the following steps: determining a pattern extraction area on a display interface in response to an area selection operation on the display interface of the display; obtaining a first brush effect picture based on the pattern extraction area, where a pattern of the first brush effect picture is a pattern corresponding to the pattern extraction area on the display interface; and obtaining a second brush effect picture based on the first brush effect picture, where the pattern of the first brush effect picture is the same as a pattern of the second brush effect picture, and definition of the second brush effect picture is greater than definition of the first brush effect picture.

The brush effect picture prepared by using the embodiments of this application has high definition, thereby improving user experience.

In addition to the foregoing steps, the terminal device may further perform any part or all of the steps in the foregoing method embodiments. For brevity of description, details are not described herein again.

During specific implementation, an embodiment of this application further provides a touch input device. The touch input device includes one or more processors, a memory, and one or more computer programs. The one or more computer programs are stored in the memory. The one or more computer programs include instructions. When the instructions are executed by the terminal device, the terminal device performs the following steps: receiving a second brush effect picture sent by the terminal device; and storing the second brush effect picture in the touch input device.

In addition to the foregoing steps, the touch input device may perform any part or all of the steps in the foregoing method embodiments. For brevity of description, details are not described herein again.

In specific implementation, this application further provides a computer storage medium. The computer storage medium may store a program. When the program is executed, some or all of the steps in the embodiments provided in this application may be performed. The foregoing storage medium may include: a magnetic disk, an optical disc, a read-only memory (read-only memory, ROM for short), or a random-access memory (random access memory, RAM for short).

During specific implementation, an embodiment of this application further provides a computer program product. The computer program product includes executable instructions. When the executable instructions are executed on a computer, the computer is enabled to perform some or all of the steps in the foregoing method embodiments.

In embodiments of this application, "at least one" means one or more, and "a plurality of" means two or more. A term "and/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects. At least one of the following items and a similar expression thereof refer to any combination of these items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that, with reference to embodiments disclosed in this specification, described units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In embodiments of the present invention, when any of the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (read-only memory. ROM for short), a random-access memory (random access memory. RAM for short), a magnetic disk, or an optical disc.

The above descriptions are merely specific implementations of the present invention. Any variation or replacement readily figured out by a person skilled in the art within the technical scope disclosed in the present invention shall fall within the protection scope of the present invention. The protection scope of the present invention shall be subject to the protection scope of the claims.

What is claimed is:

1. A method for generating a brush effect picture implemented by a terminal device, wherein the method comprises:
   detecting an area selection operation on a display interface of a display of the terminal device;
   determining, in response to the area selection operation, a pattern extraction area on the display interface;
   parsing a first pattern of the pattern extraction area to obtain a parsed first pattern, wherein the first pattern comprises a plurality of repeating unit patterns;
   extracting a minimum repeating unit pattern from the parsed first pattern to obtain a first brush effect picture based on the pattern extraction area, wherein the first brush effect picture has a first definition and has the first pattern that corresponds to the pattern extraction area;
   obtaining a second brush effect picture based on the first brush effect picture, wherein the second brush effect picture has a second definition that is greater than the first definition and has a second pattern that is the same as the first pattern; and
   applying the first brush effect picture or the second brush effect picture to a brush, to draw a target image.

2. The method of claim 1, wherein the first brush effect picture and the second brush effect picture are scalar diagrams, and wherein a second resolution of the second brush effect picture is greater than a first resolution of the first brush effect picture.

3. The method of claim 2, further comprising further obtaining the second brush effect picture based on a mapping relationship between the first brush effect picture and the second brush effect picture.

4. The method of claim 3, wherein obtaining the second brush effect picture comprises inputting the first brush effect picture into a trained neural network model to output the second brush effect picture.

5. The method of claim 1, wherein the first brush effect picture is a scalar diagram, and wherein the second brush effect picture is a vector diagram.

6. The method of claim 5, wherein obtaining the second brush effect picture comprises converting the first brush effect picture from the scalar diagram into the vector diagram to obtain the second brush effect picture.

7. The method of claim 1, further comprising:
   detecting an encircling operation on the display interface; and
   further determining, in response to the encircling operation the pattern extraction area based on an encircling area of the encircling operation.

8. The method of claim 1, further comprising storing the second brush effect picture.

9. The method of claim 1, further comprising sending the second brush effect picture to a touch input device.

10. The method of claim 1, wherein the second brush effect picture is a high definition image.

11. A terminal device comprising:
   a display comprising a display interface; and
   a processor coupled to the display and configured to:
      detect an area selection operation on the display interface;
      determine, in response to the area selection operation, a pattern extraction area on the display interface;
      parse a first pattern of the pattern extraction area to obtain a parsed first pattern, wherein the first pattern comprises a plurality of repeating unit patterns;
      extract a minimum repeating unit pattern from the parsed first pattern to obtain a first brush effect picture based on the pattern extraction area, wherein the first brush effect picture has a first definition and has the first pattern that corresponds to the pattern extraction area;
      obtain a second brush effect picture based on the first brush effect picture, wherein the second brush effect picture has a second definition that is greater than the first definition and has a second pattern that is the same as the first pattern; and
      apply the first brush effect picture or the second brush effect picture to a brush, to draw a target image.

12. The terminal device of claim 11, wherein the first brush effect picture and the second brush effect picture are scalar diagrams, and wherein a second resolution of the second brush effect picture is greater than a first resolution of the first brush effect picture.

13. The terminal device of claim 12, wherein the processor is further configured to further obtain the second brush effect picture based on a mapping relationship between the first brush effect picture and the second brush effect picture.

14. The terminal device of claim 13, wherein obtaining the second brush effect picture comprises inputting the first brush effect picture into a trained neural network model to output the second brush effect picture.

15. The terminal device of claim 11, wherein the first brush effect picture is a scalar diagram, and wherein the second brush effect picture is a vector diagram.

16. The terminal device of claim 15, wherein obtaining the second brush effect picture comprises converting the first brush effect picture from the scalar diagram into the vector diagram to obtain the second brush effect picture.

17. The terminal device of claim 11, wherein the processor is further configured to:
   detect an encircling operation on the display interface; and
   further determining, in response to the encircling operation the pattern extraction area based on an encircling area of the encircling operation.

18. The terminal device of claim 11, wherein the processor is further configured to store the second brush effect picture.

19. The terminal device of claim 11, wherein the processor is further configured to send the second brush effect picture to a touch input device.

20. The terminal device of claim 11, wherein the second brush effect picture is a high definition image.

* * * * *